(12) United States Patent
Yashin

(10) Patent No.: US 11,131,408 B2
(45) Date of Patent: Sep. 28, 2021

(54) SYSTEM, METHOD AND APPARATUS FOR EXPANSION COUPLING FOR PIPES

(71) Applicant: Westlake Chemical Corporation, Houston, TX (US)

(72) Inventor: Dmitry Yashin, Haverford, PA (US)

(73) Assignee: WESTLAKE CHEMICAL CORPORATION, Houston, TX (US)

( * ) Notice: Subject to any disclaimer, the term of this patent is extended or adjusted under 35 U.S.C. 154(b) by 816 days.

(21) Appl. No.: 15/853,116

(22) Filed: Dec. 22, 2017

(65) Prior Publication Data

US 2018/0180203 A1 Jun. 28, 2018

Related U.S. Application Data

(60) Provisional application No. 62/438,456, filed on Dec. 22, 2016.

(51) Int. Cl.
*F16L 21/03* (2006.01)
*F16L 55/16* (2006.01)
*F16L 37/14* (2006.01)
*F16L 27/12* (2006.01)
*F16L 41/02* (2006.01)

(52) U.S. Cl.
CPC ........... *F16L 21/03* (2013.01); *F16L 27/1273* (2019.08); *F16L 37/148* (2013.01); *F16L 55/1608* (2013.01); *F16L 41/021* (2013.01)

(58) Field of Classification Search
CPC ... F16L 21/03; F16L 27/1273; F16L 55/1608; F16L 37/148; F16L 41/021
See application file for complete search history.

(56) References Cited

U.S. PATENT DOCUMENTS

| | | | | |
|---|---|---|---|---|
| 385,148 A | * | 6/1888 | Stewart et al. | |
| 3,389,923 A | * | 6/1968 | Love, Jr. | F16L 37/088 |
| | | | | 285/321 |
| 3,563,574 A | * | 2/1971 | Jackson | F16L 17/035 |
| | | | | 285/187 |
| 4,687,232 A | | 8/1987 | Zimmerman | |
| 5,662,360 A | * | 9/1997 | Guzowski | F16L 37/084 |
| | | | | 285/110 |
| 5,816,625 A | | 10/1998 | Clarke | |
| 5,918,914 A | * | 7/1999 | Morris | F16L 17/02 |
| | | | | 285/351 |
| 6,494,493 B1 | * | 12/2002 | Baruh | F16L 21/002 |
| | | | | 138/97 |
| 7,111,873 B1 | | 9/2006 | Coogle | |
| 7,963,569 B2 | | 6/2011 | Subbaraman et al. | |
| 8,313,607 B2 | | 11/2012 | Quinn | |
| 8,764,066 B1 | | 7/2014 | Rice et al. | |
| 8,910,979 B1 | * | 12/2014 | Fails | F16L 37/148 |
| | | | | 285/15 |
| 2018/0363815 A1 | * | 12/2018 | Jacobs | F16L 21/08 |

* cited by examiner

*Primary Examiner* — James M Hewitt, II
(74) *Attorney, Agent, or Firm* — Lempia Summerfield Katz LLC

(57) ABSTRACT

A coupling can include a coupling body having an axis, an axial length, an axial center, axial ends and an inner surface comprising an inner diameter that is substantially constant over an entirety of the axial length. A single shoulder can protrude radially inward relative to the axis from the inner surface, such that the inner surface has no other shoulders. In a version, the single shoulder is not axially aligned with the axial center of the coupling body.

22 Claims, 11 Drawing Sheets

SYSTEM, METHOD AND APPARATUS FOR EXPANSION COUPLING FOR PIPES

This application claims priority to and the benefit of U.S. Prov. App. No. 62/438,456, filed Dec. 22, 2016, which is incorporated herein by reference in its entirety.

BACKGROUND OF THE INVENTION

Field of the Disclosure

The present invention relates in general to pipes and, in particular, to a system, method and apparatus for an in-line removable coupling for pipes.

Description of the Prior Art

Conventional, restrained pipe joint systems typically have removable splines that are inserted into pipes, or pipe and coupling joints, to complete the pipe assembly. On occasion, portions of the pipe assembly must be repaired or replaced. This typically entails disassembling the affected portion of the pipe assembly, and then having to axially move the entire pipeline on either side of the affected portion to uncouple one or more joints. After the new pipe and/or coupling is installed, the entire pipeline is axially moved back to its original position to couple the new components into the pipeline assembly. Although this solution is workable, improvements in pipe assemblies continue to be of interest.

SUMMARY

Embodiments of a system, method and apparatus for forming a joint with at least two pipes are disclosed. For example, a coupling can include a coupling body having an axis, an axial length, an axial center, axial ends and an inner surface comprising an inner diameter that is substantially constant over an entirety of the axial length. A single shoulder can protrude radially inward relative to the axis from the inner surface. The inner surface can have no other shoulders. In a version, the single shoulder is not axially aligned with the axial center of the coupling body.

Embodiments of a pipe system can include a coupling having an axis, axial ends, an interior and an axial-facing portion in the interior. At least two pipes can be configured to be inserted into different axial ends of the coupling and secured therein with retainers. The axial-facing portion of the coupling can be configured to substantially remain in contact with only one of the pipes. Another one of the pipes does not axially abut, either directly or indirectly, any axial-facing portion of the coupling in the installed position other than through a respective retainer, such that said another one of the pipes only radially abuts the coupling with respect to the axis.

Embodiments of a method of replacing pipe in a pipe assembly also are disclosed. The method can include providing the pipe assembly with an axis and a plurality of pipes secured to a plurality of couplings with retainers; releasing the retainers from a selected coupling having a first pipe and a second pipe in need of replacement; releasing the retainer from an adjacent coupling joined to the second pipe; axially sliding the selected coupling over the first pipe until the first pipe contacts a shoulder in the selected coupling, such that the second pipe is exposed from the selected coupling; moving the second pipe off-axis from the selected coupling, and removing the second pipe from the adjacent coupling; and then installing a third pipe, in place of the second pipe, by inserting the third pipe into the adjacent coupling, moving the third pipe on-axis with the selected coupling, and axially sliding the selected coupling onto the third pipe.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

The use of the same reference symbols in different drawings indicates similar or identical items.

DETAILED DESCRIPTION

Figure 1:
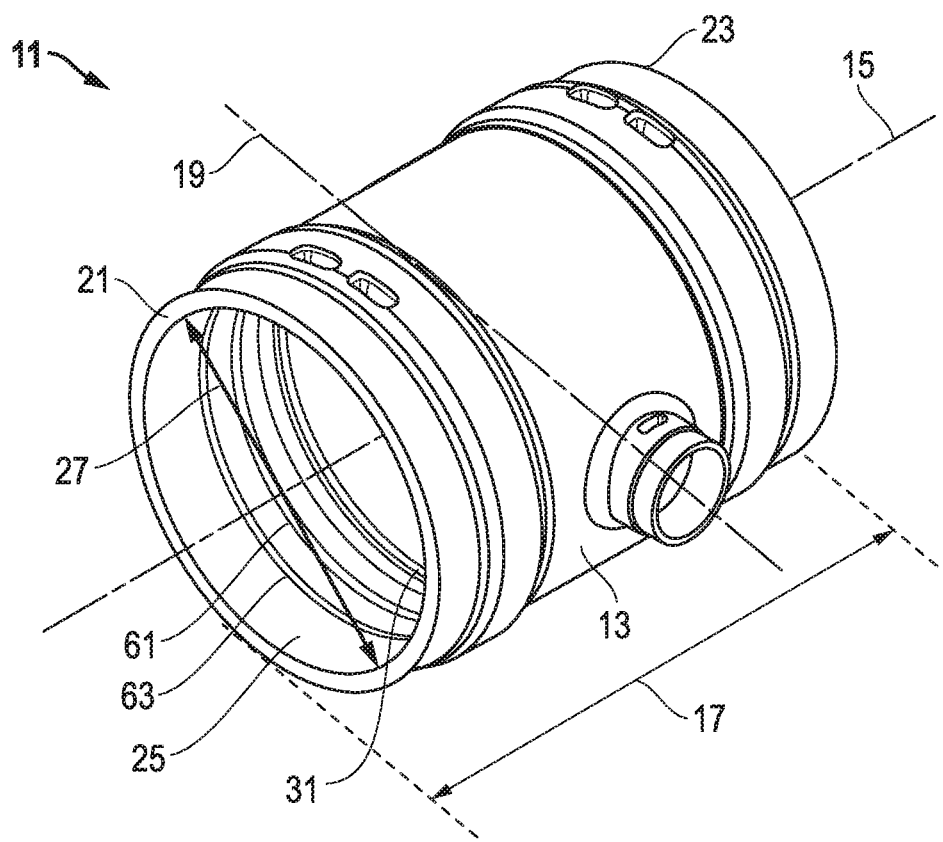
FIG. 1 is an isometric view of an embodiment of a coupling.
Figure 2:
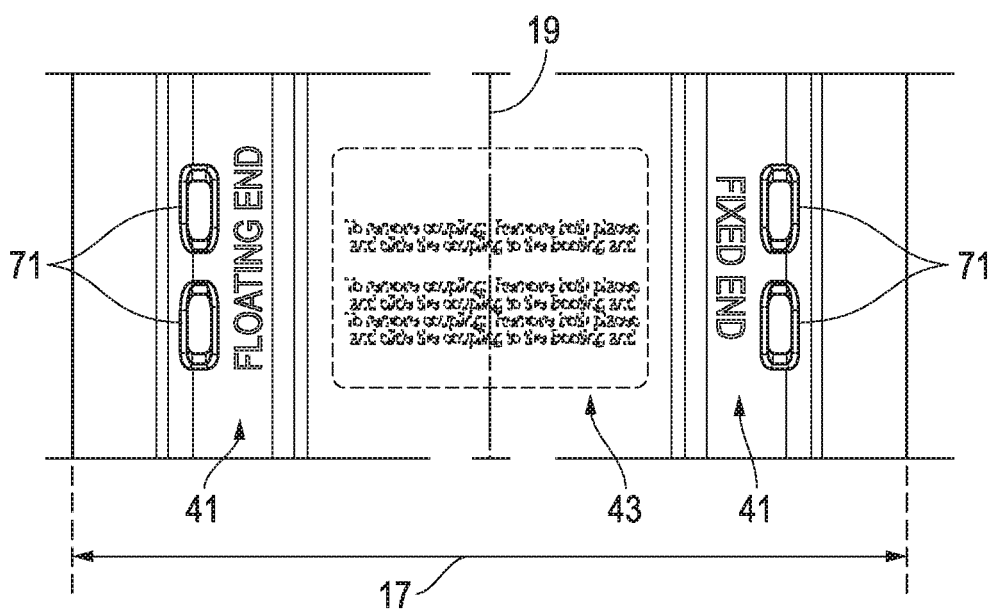
FIG. 2 is a side view of an embodiment of the coupling of FIG. 1.

FIGS. 1 and 2 depict isometric and top views of an embodiment of a portion of a tubular member, such as a coupling 11. Although the coupling 11 is depicted as a tee (e.g., for connecting up to, in one example, three pipes), the coupling 11 can comprise alternate embodiments, such as a fitting, a straight coupling 111 (e.g., FIGS. 7-10) for connecting only two pipes, an elbow, a plug, a sweep or still other types of connectors known to those of ordinary skill in the art. The coupling 11 can be configured to freely axially release the pipes from the axial ends thereof from which the pipes are configured to protrude.

The coupling 11 can include a coupling body 13 having an axis 15, an axial length 17, an axial center 19 and axial ends 21, 23. In addition, coupling 11 can include an inner surface 25 having an inner diameter 27 that is substantially constant over an entirety of the axial length 17. Embodiments of coupling 11 also can include a shoulder 31 (FIGS. 1 and 3-6). Shoulder 31 can protrude radially inward relative to the axis 15 from the inner surface 25 to limit axial movement of one or more of the pipes 33, 35 (see, e.g., FIG. 3). Shoulder 31 can be the only radially inward-protrusion from inner surface 25, such that the inner surface 25 has no other shoulders. Examples of shoulder 31 can include a mechanical stop comprising one of a rectangular hard stop and a chamfered stop. In one version, the shoulder 31 can be configured to limit axial insertion of both pipes 33, 35, such that the pipes 33, 35 can be configured to never make contact with each other inside the coupling 11 due to the presence of the shoulder 31. Versions of the shoulder 31 can not be axially aligned with the axial center 19 of the coupling body 13.

Figure 3:
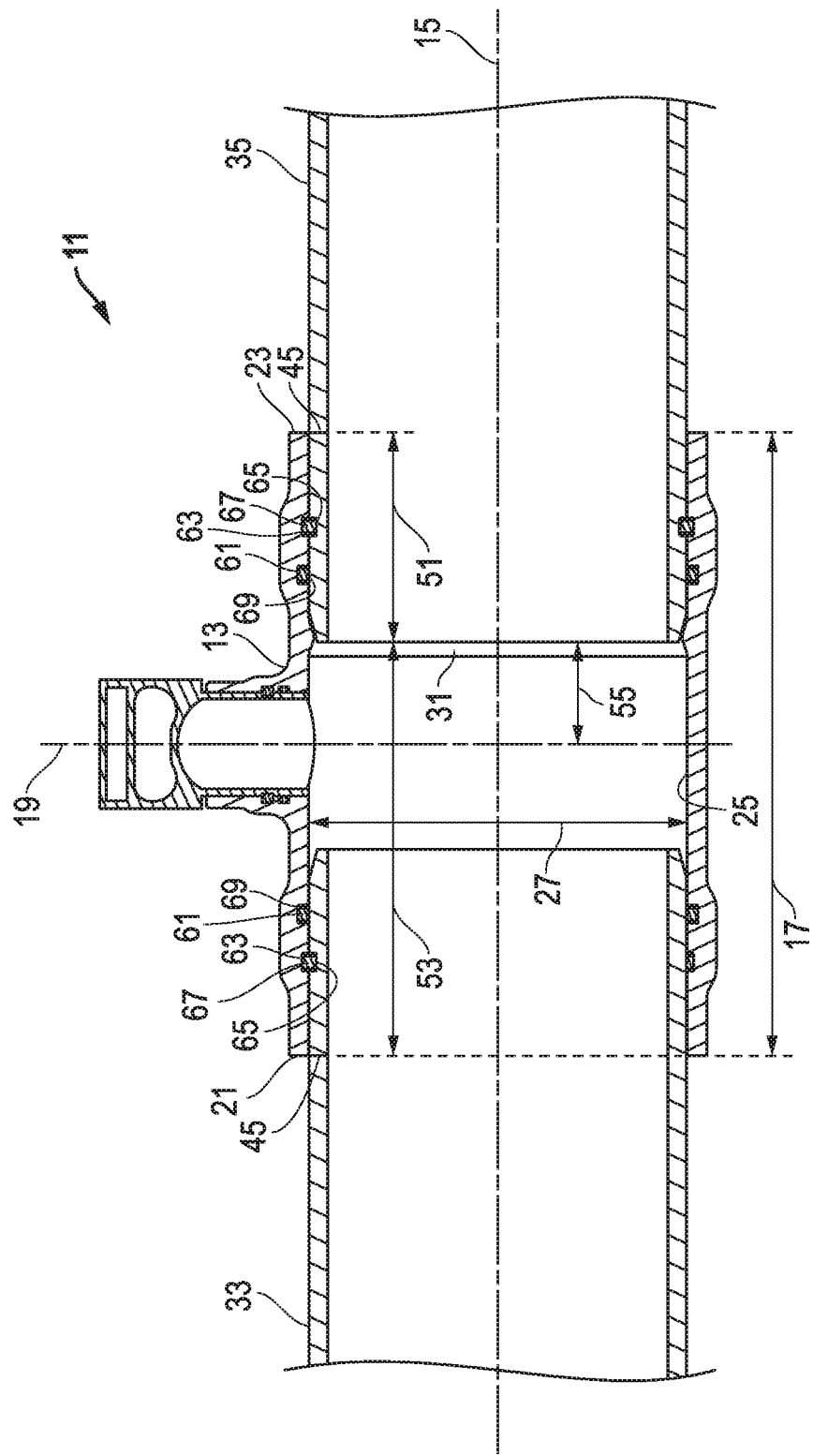
FIG. 3 is a sectional side view of an embodiment of a pipe assembly with the coupling of FIG. 1 or 2.
Figure 4:
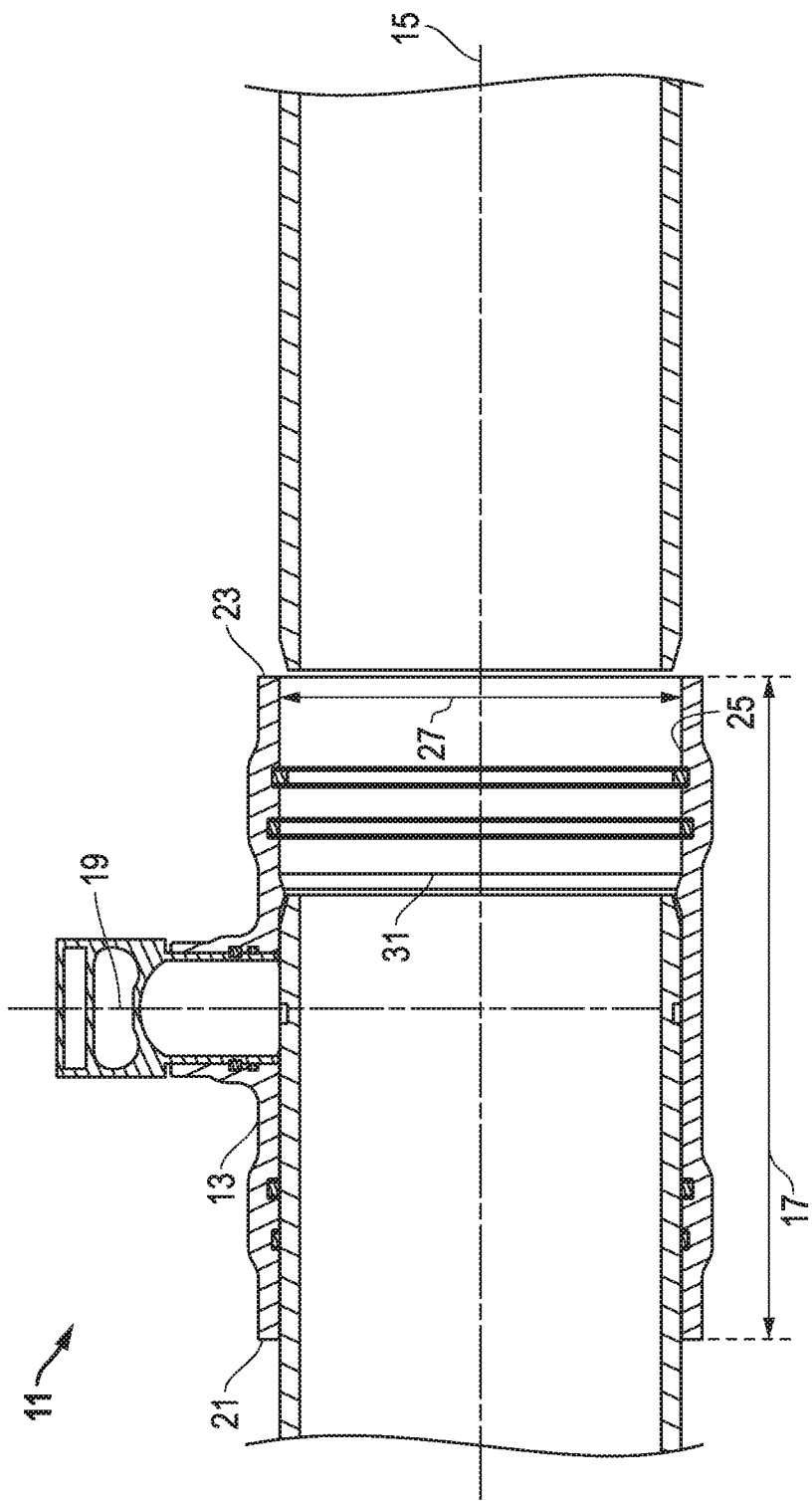
FIG. 4 is a sectional side view of an initial stage of disassembly of the pipe assembly of FIG. 3.
Figure 5:
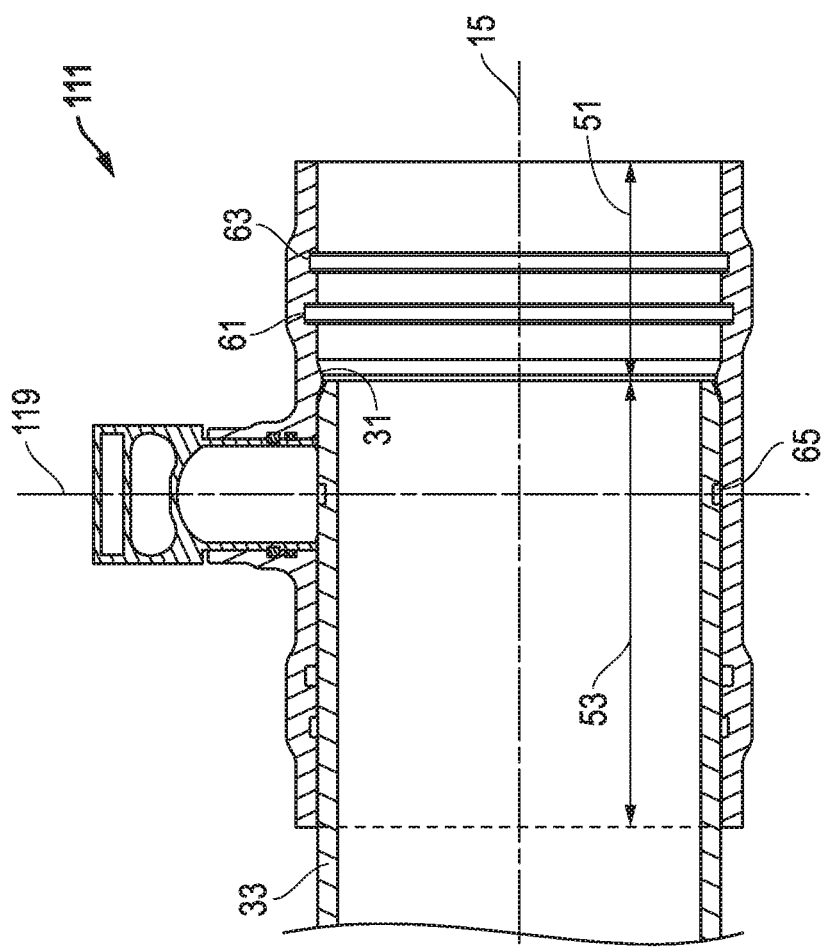
FIG. 5 is a sectional side view of an intermediate stage of disassembly of the pipe assembly of FIG. 4.
Figure 6:
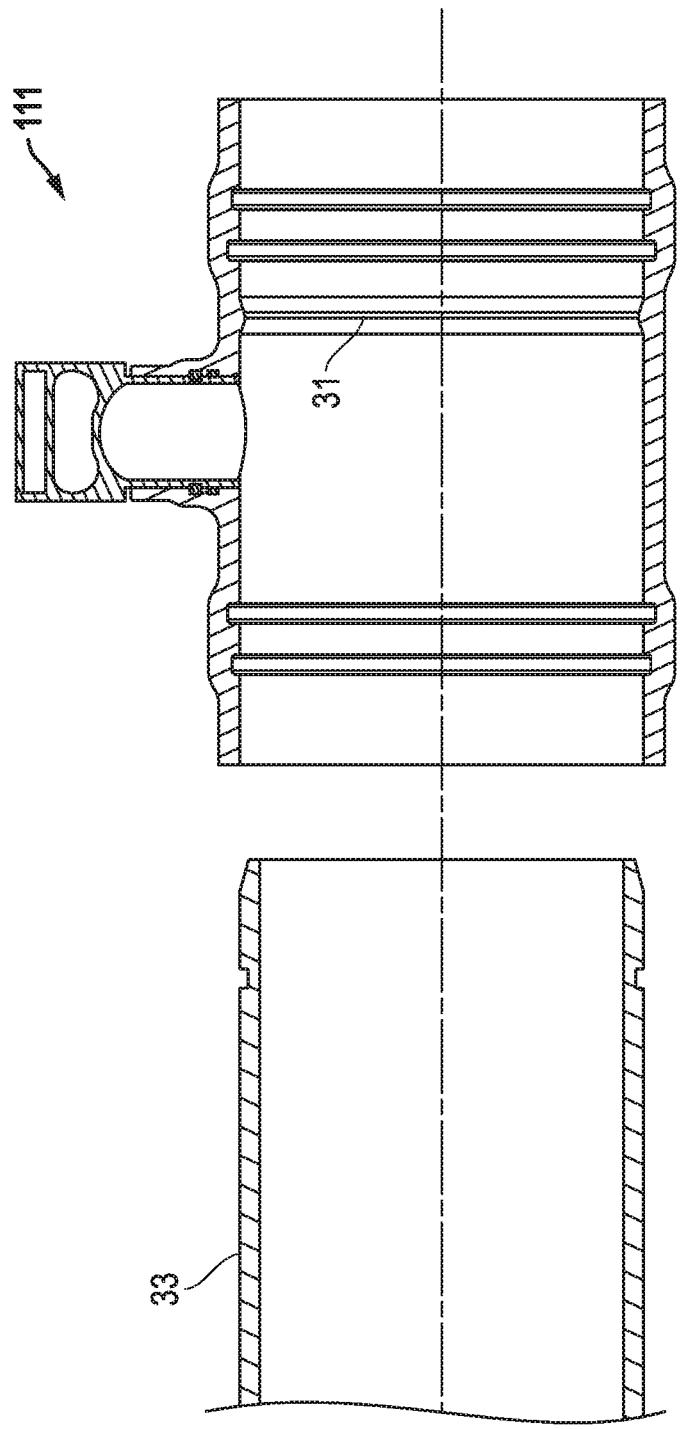
FIG. 6 is a sectional side view of a subsequent stage of disassembly of the pipe assembly of FIG. 5.
Figure 7:
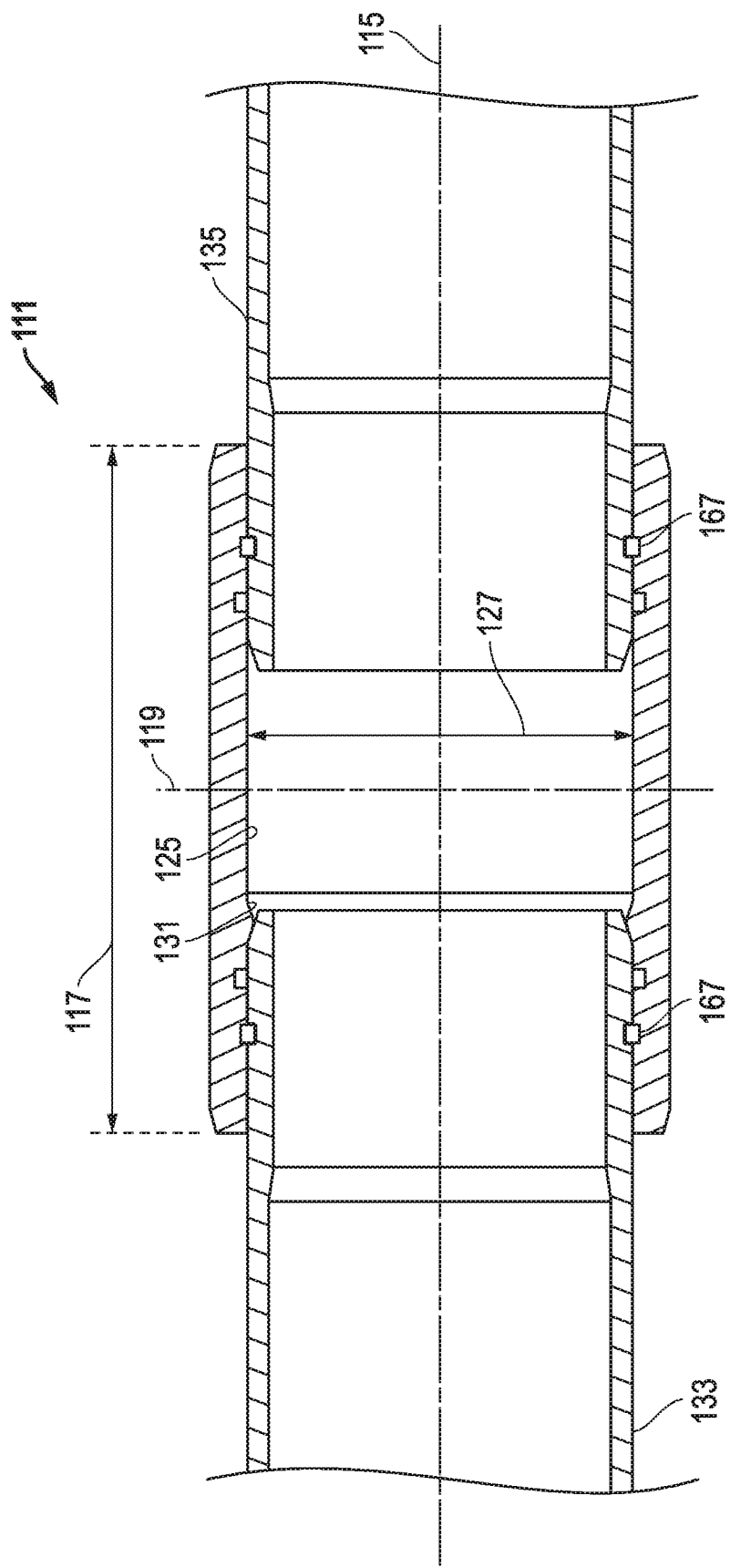
FIG. 7 is a sectional side view of another embodiment of a pipe assembly.

FIG. 3 further depicts an installed configuration for coupling 11. In some embodiments, the shoulder 31 can be configured to substantially remain in contact with only one of the pipes 35, such that the other pipe 33 is free of contact with the shoulder 31, in the final assembly. In some examples, the pipe 35 can slightly axially retract (e.g., up to about ¼ inch) from contact with shoulder 31 after installation.

As best shown in FIG. 2, an exterior of the coupling 11 can include visual indicia 41 to indicate a location of the shoulder 31 from the exterior of the coupling 11. For example, the visual indicia 41 can comprise text configured to describe pipe position (e.g., "FIXED END" for pipe 35, and "FLOATING END" for pipe 33). In the example illustrated in FIGS. 2 and 3, the FIXED END is closer to the shoulder 31 and pipe 35, and the FLOATING END is further from the shoulder 31 and closer to pipe 33.

In some versions, forms of instructions 43 can be included for pipe installation and pipe removal. Such instructions 43 can be molded or stamped with coupling 11 during its original manufacture. Alternatively or in addition, the pipes 33, 35 themselves can include visual indicia 45 (FIG. 3) configured to indicate correct depth of axial insertion of the pipes 33, 35 in the coupling 11. Versions of the visual indicia 45 can comprise, for example, a line or shallow groove circumscribing the pipes 33, 35 adjacent axial ends thereof.

In some embodiments, an axial centerline of the shoulder 31 (FIG. 3) can be axially spaced apart from one axial end 23 by a first distance 51. The axial centerline of the shoulder 31 can be axially spaced apart from the other second axial end 21 by a second distance 53. In one example, the second distance 53 can be at least about twice or double the first distance 51.

Versions of the coupling 11 can include the axial centerline of the shoulder 31 being axially spaced apart from the axial center 19 of the coupling 11 by a distance 55 of at least about 1% of the coupling axial length 17. In other versions, the distance 55 can be at least about 5%, such as at least about 10%, at least about 20%, or even at least about 25% of the coupling axial length 17. In still other versions, the axial centerline of the shoulder 31 can be axially spaced apart from the axial center 19 of the coupling 11 by the distance 55 of not greater than about 50%, such as not greater than about 45%, not greater than about 40%, not greater than about 35%, or even not greater than about 30%. Such a distance 55 can be defined in a range between any of the foregoing values.

The coupling 11 can comprise one or more seal grooves 61 and/or retainer grooves or retaining ring grooves, such as spline grooves 63. Versions of pipe 33, 35 can comprise only a pipe retaining ring groove, such as pipe spline groove 65, but not a pipe seal groove. The coupling 11 can be configured to retain the pipes 33, 35 with one or more retainers, such as splines 67. In addition, the shoulder 31 can automatically align the spline grooves 63, 65 of the coupling 11 and at least one pipe (e.g., pipe 35 in FIG. 3) when the pipe 35 abuts the shoulder 31. Versions of the coupling 11 can include installing the splines 67 only from an exterior of the coupling 11, such as through spline holes 71 (FIG. 2). Examples of the coupling 11 and the pipes 33, 35 can not be threaded.

Embodiments of the assembly can be sealed with seals 69 in a final assembly or installed configuration. In some embodiments, no other fittings are required to form the joint between the coupling 11 and the pipes 33, 35 other than splines 67 and seals 69.

Other forms of retaining rings can comprise pinch-type rings or clamps. Such rings or clamps can have a nominal or "rest" configuration, wherein they define a first diameter to retain one element on another element. The rings or clamps also can have a pinched or expanded configuration, wherein they define a second diameter that is greater than the first diameter to release one element from another element. The rings or clamps can have projections that extend radially beyond a perimeter thereof. When the projections are squeezed or pinched toward each other, the ring or clamp moves from the nominal configuration to the expanded configuration.

Some embodiments of the coupling 11 and/or pipes 33, 35 can comprise or consist of one or more polymers (e.g., polyvinylchloride, or PVC. Coupling 11 and pipes 33, 35 can be injection molded, or extruded and machined. The pipes 33, 35 can be configured to be identical to each other. Versions of the pipes 33, 35 can have a substantially constant outer diameter, other than axial tips thereof, which can be chamfered as shown. In some examples, the coupling 11 can be configured to not prevent rotation of the pipes 33, 35 relative to each other and to the coupling 11.

Embodiments of a pipe system can include the coupling 11, axis 15, axial ends 21, 23, an interior or inner surface 25, and an axial-facing portion in the interior, such as shoulder 31. At least two pipes 33, 35 can be configured to be inserted into different axial ends 21, 23 of the coupling 11 and secured therein with splines 67. The axial-facing portion of the coupling 11 (e.g., shoulder 31) can be configured to substantially remain in contact with only one of the pipes 35 at final assembly. The other pipe 33 can not axially abut, either directly or indirectly, any axial-facing portion (e.g., shoulder 31) of the coupling 11 in the installed (final) position other than indirectly through a respective spline 67. Thus, versions of pipe 33 only radially abut the coupling 11 with respect to the axis 15.

Moreover, the axial-facing portion (e.g., shoulder 31) can comprise or consist of the only axial-facing portion in the interior of the coupling 11 other than spline grooves 63 and seal grooves 61. The coupling 11 can include an inner diameter 27 that is substantially constant over an entirety of the axial length 17 other than the spline and seal grooves 63, 61. The axial-facing portion can comprise or consist of a single shoulder 31 protruding radially inward relative to the axis 15 from the interior, such that the interior has no other shoulders. As noted herein, shoulder 31 (i.e., the axial-facing portion) can not axially align with the axial center 19 of the coupling 11. Other features and elements of the axial-facing portion can include those described elsewhere herein for other embodiments of the shoulder.

In other examples, the coupling 11 can include a first pipe axial insertion depth 51, a second pipe axial insertion depth 53, and spline grooves 63. The second pipe axial insertion depth 53 can be at least about double the first pipe axial insertion depth 51. The coupling 11 can be configured to directly physically engage two identical pipes 33, 35.

FIGS. 7-10 depict an embodiment of a pipe system having coupling 111 with an axis 115, an axial length 117, an axial center 119, and an interior 125 with an inner diameter 127 that is substantially constant over an entirety of the axial length 117. A single shoulder 131 can protrude radially inward from the inner diameter 127, such that the coupling has no other shoulders in the interior 125. In addition, the single shoulder 131 can be not axially aligned with the axial center 119 of the coupling 111. At least two pipes 133, 135 can be configured to be mounted to the coupling 111.

Embodiments of a method of replacing pipe in a pipe assembly can include the following actions: providing the pipe assembly with an axis 115 and a plurality of pipes 133, 135 secured to a plurality of couplings 111 (for simplicity, only one shown) with splines 167; removing the splines 167 from a selected coupling 111 having a first or "good" pipe 135 and a second or "bad" pipe 133 in need of replacement, and removing the spline (not shown) from an adjacent coupling (not shown) splined to the second pipe 133.

Figure 8:
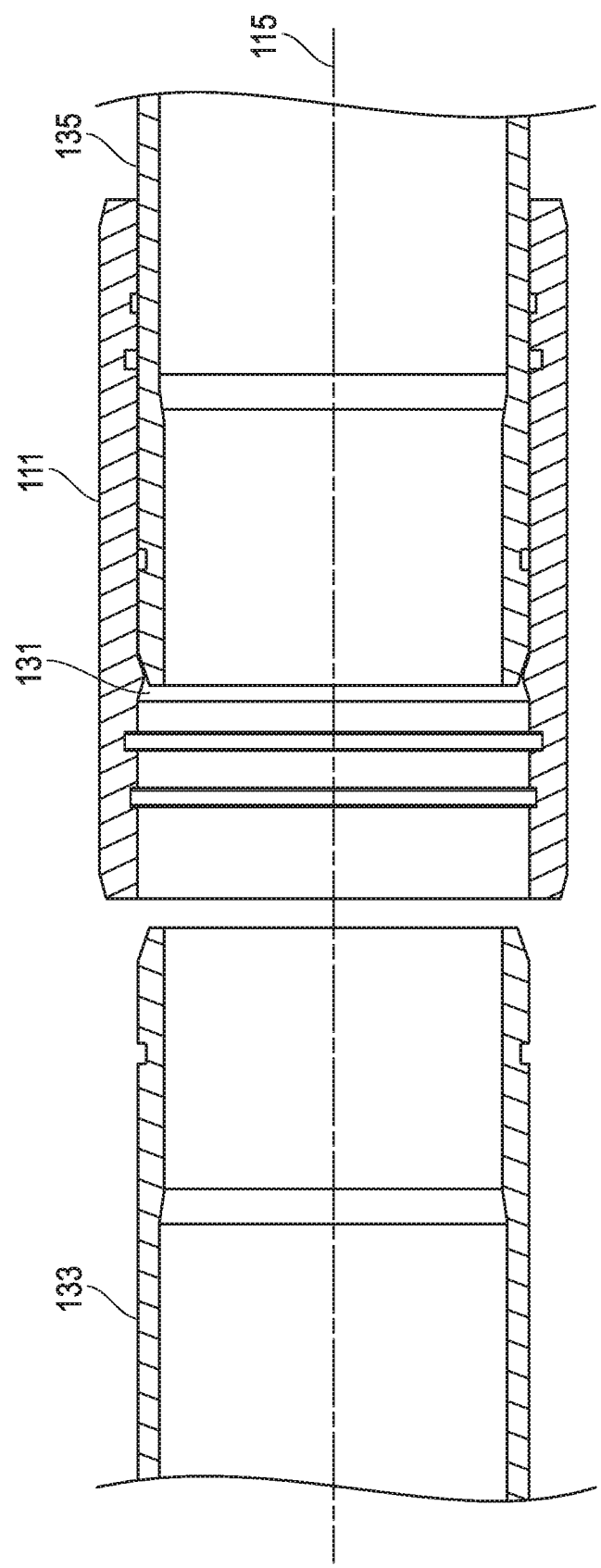
FIG. 8 is a sectional side view of an initial stage of disassembly of the pipe assembly of FIG. 7.

As shown in FIG. 8, the method continues by axially sliding only the coupling 111 over the first pipe 135 until the first pipe 135 contacts a shoulder 131 in the coupling 111, such that the second pipe 133 is exposed from the selected coupling 111. Note that the pipes 133, 135 themselves have maintained their relative axial positions and have not been axially moved; only the coupling 111 has moved axially.

Figure 9:
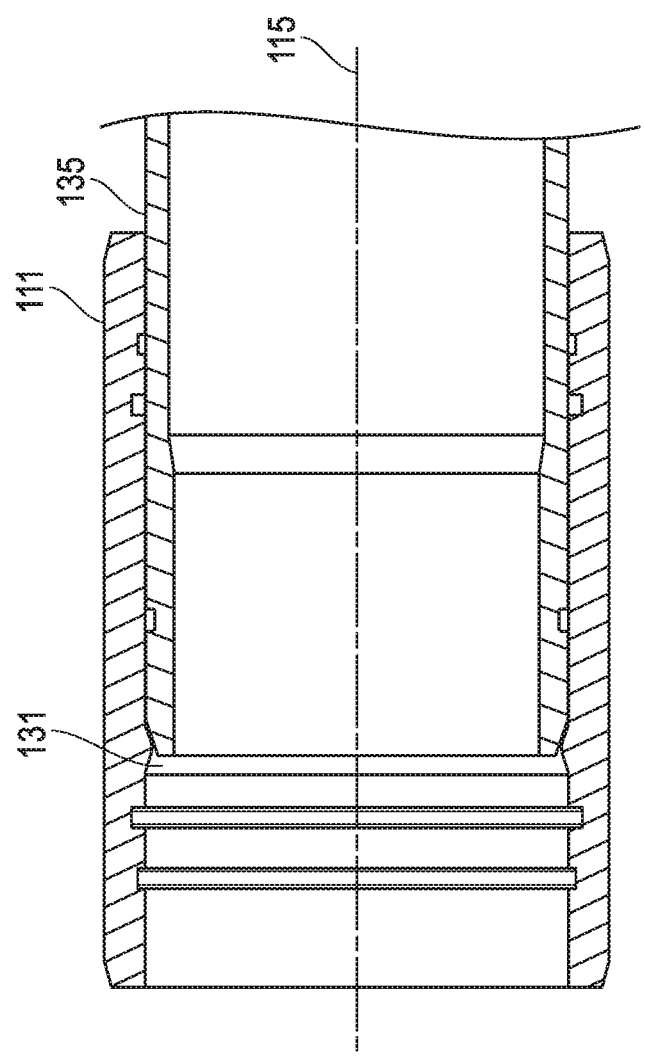
FIG. 9 is a sectional side view of an intermediate stage of disassembly of the pipe assembly of FIG. 8.
Figure 10:
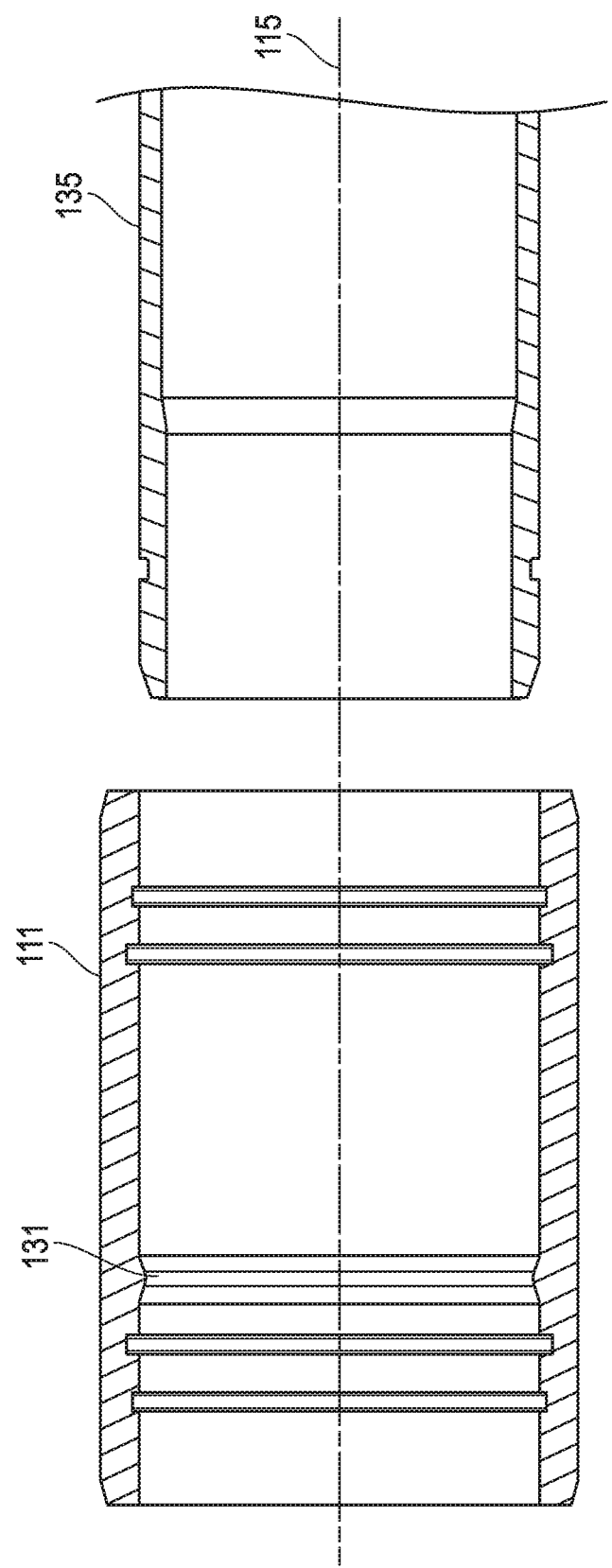
FIG. 10 is a sectional side view of a subsequent stage of disassembly of the pipe assembly of FIG. 9.

In FIG. 9, the proximal end of the second pipe 133 is moved in a radial direction, off-axis 115 (e.g., out of view) away from the coupling 111, and a distal end of the second pipe 133 is removed (completely; both axially and radially) from the adjacent coupling (not shown). The method can continue by installing a new pipe (not shown), in place of the second pipe 133, by first inserting the distal end of the new pipe into the adjacent coupling (not shown), moving the proximal end of the new pipe on-axis 115 with the coupling 111, and axially sliding the coupling 111 onto the proximal end of the new pipe. Again, in this procedure, only the coupling moves axially to complete the assembly. Accordingly, at least one pipe (e.g., pipe 133) can be positioned in both an installed state and a disassembled state with respect to the coupling without the at least one pipe being axially repositioned.

Under some circumstances, pipe assemblies can be incorrectly installed in the field. For example, for a pipe assembly comprising couplings 111, all of the couplings should be oriented in a same direction (i.e., with shoulders 131 always on the downstream side of the pipe assembly). However, for those situations where two adjacent couplings 111 are installed with shoulders 131 unintentionally oriented toward each other, embodiments of a method of replacing a pipe in such a pipe assembly also are disclosed. For example, the method can include providing the pipe assembly with an axis and a plurality of pipes secured to a plurality of couplings with splines; removing the splines from a selected coupling having a first or "good" pipe and a second or "bad" pipe in need of replacement, and removing the splines from an adjacent coupling splined to the second pipe, the adjacent coupling having a third pipe; axially sliding the selected coupling over the first pipe until the first pipe contacts a shoulder in the selected coupling, and axially sliding the adjacent coupling over the third pipe until the third pipe contacts a second shoulder in the adjacent coupling, such that the second pipe is exposed from the selected coupling and the adjacent coupling; removing the second pipe from the selected coupling and the adjacent coupling; and then installing a new pipe, in place of the second pipe, by axially sliding the selected coupling and the adjacent coupling onto the new pipe.

In addition, there can situations in the field where the pipes are operational or "good" but the coupling is in need of replacement. For such situations, one method of replacing a component in a pipe assembly can include providing a pipe assembly with an axis and a plurality of pipes secured to a plurality of components with splines; removing the splines from a first component in need of replacement, the first component having first and second pipes; axially sliding the first component over the first pipe until the first pipe contacts a shoulder in the first component, such that the second pipe is exposed from the first component; moving the second pipe off-axis relative to the first component; removing the first component from the first pipe; and then installing a new component, in place of the first component, by axially inserting the new component onto the first pipe, repositioning the second pipe on-axis relative to the new component, and axially sliding the new component onto the second pipe.

A version of the coupling body can comprise spline grooves, each of the pipes can include a pipe spline groove and a pipe seal groove, and the coupling can be configured to retain the pipes with splines in an installed configuration. In another version, the pipes can be configured to make contact with each other inside the coupling despite the presence of the single shoulder.

Figure 11:
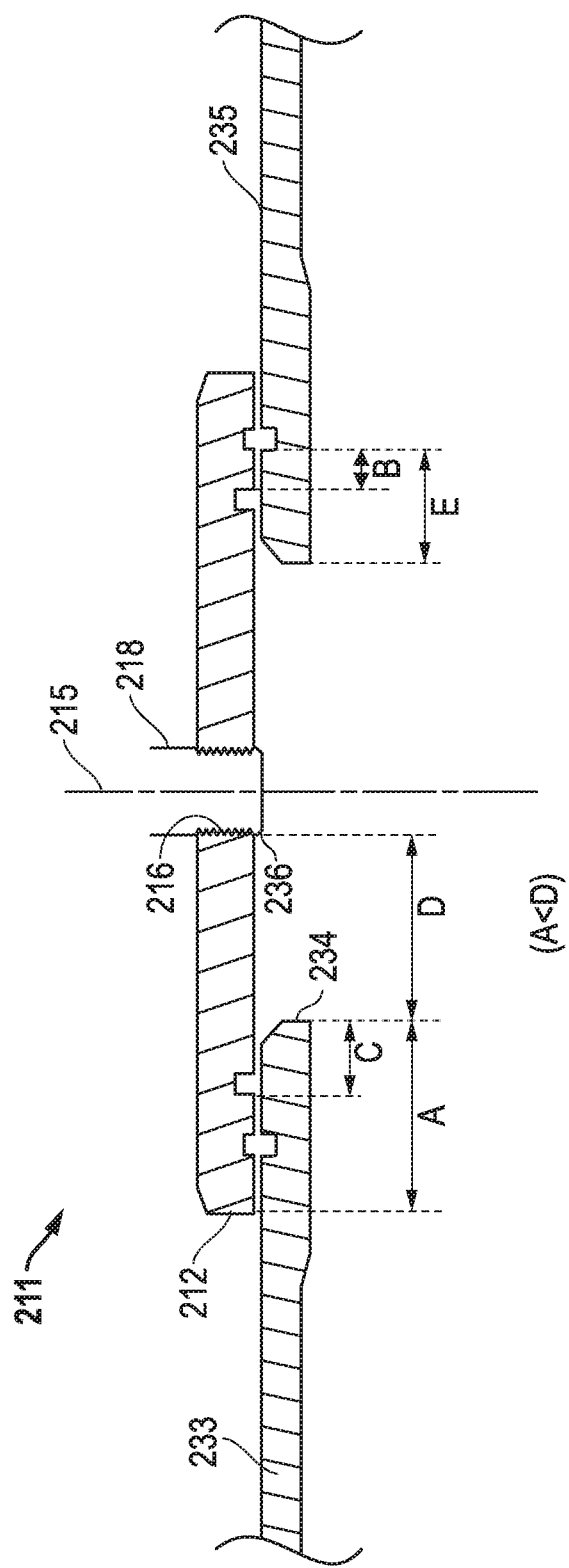
FIG. 11 is a schematic, half-sectional side view of still another embodiment of a pipe assembly.

FIG. 11 depicts an embodiment of a coupling 211 having an axial center 215 comprising a tapped hole 216 configured for connection to a component 218. The tapped hole 216 can be configured to be plugged when the component 218 is not used. In some versions, the component 218 comprises a tee or a wye. Pipes 233, 235 can engage coupling 211. FIG. 11 also defines a distance A as an axial overlap distance from one of the coupling axial ends 212 to a respective pipe axial end 234. A distance D can be defined as an axial separation distance from one of the pipe axial ends 234 to a stop 236, such as the component 218, the single shoulder, etc. In an example, D>A.

Figure 12:
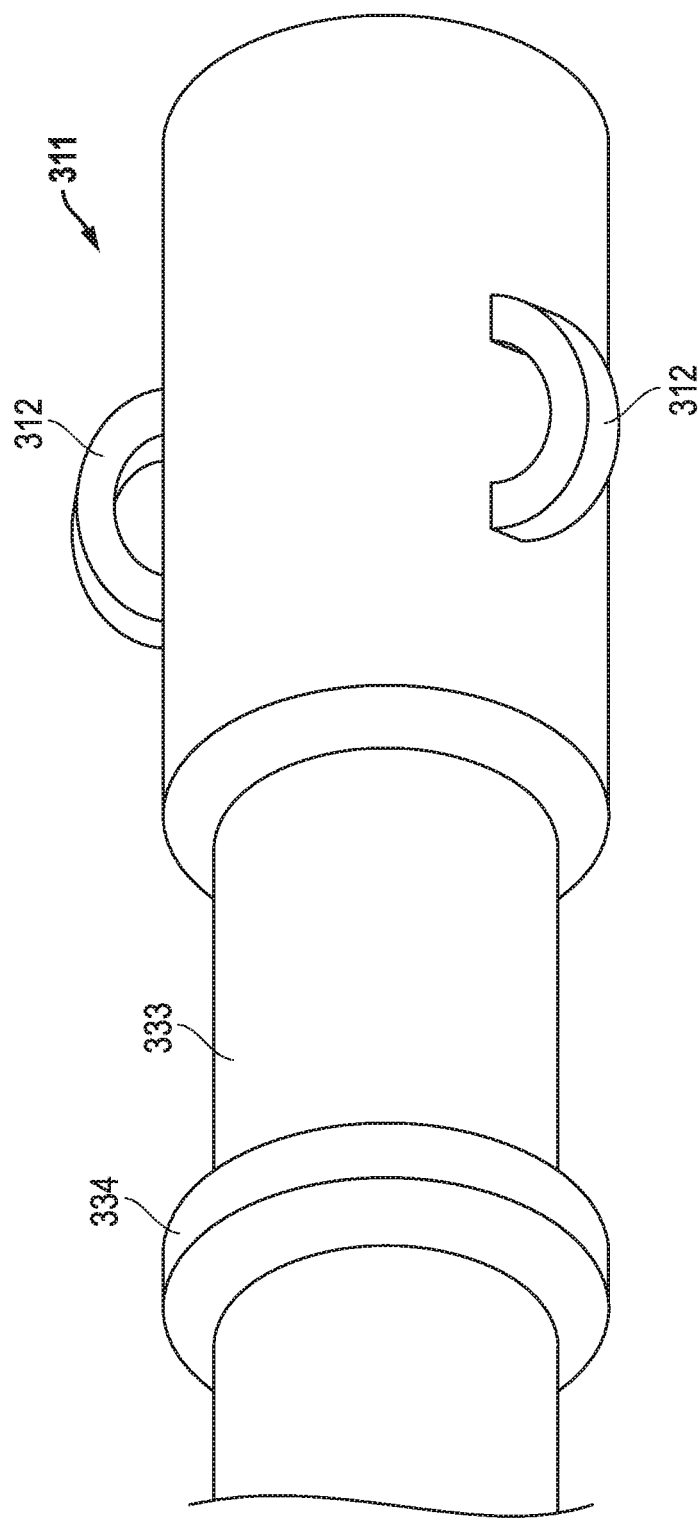
FIG. 12 is an isometric side view of yet another embodiment of a pipe system.

FIG. 12 depicts an embodiment of a coupling 311 (or belled end of a pipe) comprising one or more anchors 312 (e.g., two shown). Anchors 312 can be configured to enhance movement of the coupling 311 relative to the pipe 333 using one or more tools. An example of such a tool can include a come-a-long or other device for assisting insertion of pipe 333 into coupling 311 to overcome friction therebetween. Likewise pipe 333 can include one or more features 334 for providing an anchor to better drive pipe 333 into coupling 311.

Other versions can include one or more of the following embodiments:

Embodiment 1

A coupling for forming a joint with at least two pipes, the coupling comprising:
a coupling body having an axis, an axial length, an axial center, axial ends and an inner surface comprising an inner diameter that is substantially constant over an entirety of the axial length; and
a single shoulder protruding radially inward relative to the axis from the inner surface, such that the inner surface has no other shoulders, and the single shoulder is not axially aligned with the axial center of the coupling body.

Embodiment 2

The coupling of any of these embodiments, wherein, in an installed configuration, the single shoulder is configured to substantially remain in contact with only one of the pipes, such that another of the pipes is free of contact with the single shoulder.

Embodiment 3

The coupling of any of these embodiments, wherein an exterior of the coupling body comprises visual indicia to indicate a location of the single shoulder from the exterior of the coupling.

Embodiment 4

The coupling of any of these embodiments, wherein the visual indicia comprises text configured to describe pipe position, and instructions for pipe installation and pipe removal.

Embodiment 5

The coupling of any of these embodiments, wherein the pipes comprise visual indicia configured to indicate correct depth of axial insertion of the pipes in the coupling.

Embodiment 6

The coupling of any of these embodiments, wherein the visual indicia comprise shallow grooves circumscribing the pipes on axial ends thereof.

Embodiment 7

The coupling of any of these embodiments, wherein an axial centerline of the single shoulder is axially spaced apart from a first axial end by a first distance, the axial centerline of the single shoulder is axially spaced apart from a second axial end by a second distance, and the second distance is at least about twice the first distance.

Embodiment 8

The coupling of any of these embodiments, wherein an axial centerline of the single shoulder is axially spaced apart from the axial center of the coupling by at least about 1% of the coupling axial length, at least about 5%, at least about 10%, at least about 20%, or at least about 25%; and not greater than about 50%, not greater than about 45%, not greater than about 40%, not greater than about 35%, or not greater than about 30%.

Embodiment 9

The coupling of any of these embodiments, wherein the coupling comprises a straight coupling for only two pipes or a tee for at least three pipes.

Embodiment 10

The coupling of any of these embodiments, wherein the coupling comprises at least one of a fitting, a plug and a sweep.

Embodiment 11

The coupling of any of these embodiments, wherein the single shoulder comprises a mechanical stop comprising one of a rectangular hard stop and a chamfered stop.

Embodiment 12

The coupling of any of these embodiments, wherein the coupling body is configured to freely axially release the pipes from the axial ends from which the pipes are configured to protrude.

Embodiment 13

The coupling of any of these embodiments, wherein the coupling body comprises at least one of a seal groove and a retaining ring groove.

Embodiment 14

The coupling of any of these embodiments, wherein the coupling body comprises retaining ring grooves and seal grooves, each of the pipes comprises only a pipe retaining ring groove but not a pipe seal groove, and the coupling is configured to retain the pipes with retaining rings in an installed configuration.

Embodiment 15

The coupling of any of these embodiments, wherein no other fittings are required to form the joint between the coupling and the pipes other than retaining rings and seals.

Embodiment 16

The coupling of any of these embodiments, wherein the retaining rings must be installed from an exterior of the coupling.

Embodiment 17

The coupling of any of these embodiments, wherein the coupling and the pipes are not threaded.

Embodiment 18

The coupling of any of these embodiments, wherein the coupling is configured to not prevent rotation of the pipes relative to each other and to the coupling.

Embodiment 19

The coupling of any of these embodiments, wherein the single shoulder is configured to limit axial insertion of both pipes, such that the pipes are configured to never make contact with each other inside the coupling due to the presence of the single shoulder.

Embodiment 20

The coupling of any of these embodiments, wherein the pipes have a substantially constant outer diameter, other than axial tips thereof, which can be chamfered.

Embodiment 21

The coupling of any of these embodiments, wherein the coupling body is injection molded or extruded and machined.

Embodiment 22

The coupling of any of these embodiments, wherein the pipes are configured to be identical to each other.

Embodiment 23

A pipe system, comprising:
a coupling having an axis, axial ends, an interior and an axial-facing portion in the interior; and
at least two pipes configured to be inserted into different axial ends of the coupling and secured therein with retaining rings, the axial-facing portion of the coupling is configured to substantially remain in contact with only one of the pipes, and another one of the pipes does not axially abut, either directly or indirectly, any axial-facing portion of the coupling in the installed position other than through a respective retaining ring, such that said another one of the pipes only radially abuts the coupling with respect to the axis.

Embodiment 24

The pipe system of any of these embodiments, wherein the axial-facing portion comprises the only axial-facing portion in the interior of the coupling other than retaining ring grooves and seal grooves.

Embodiment 25

The pipe system of any of these embodiments, wherein the coupling comprises an inner diameter that is substantially constant over an entirety of the axial length other than the retaining ring and seal grooves.

Embodiment 26

The pipe system of any of these embodiments, wherein the axial-facing portion comprises a single shoulder protruding radially inward relative to the axis from the interior, such that the interior has no other shoulders.

Embodiment 27

The pipe system of any of these embodiments, wherein the axial-facing portion is not axially aligned with an axial center of the coupling.

Embodiment 28

The pipe system of any of these embodiments, wherein an exterior of the coupling comprises visual indicia to indicate a location of the axial-facing portion from the exterior of the coupling.

Embodiment 29

The pipe system of any of these embodiments, wherein the visual indicia comprises text configured to describe pipe position.

Embodiment 30

The pipe system of any of these embodiments, wherein the visual indicia comprises instructions for pipe installation and pipe removal.

Embodiment 31

The pipe system of any of these embodiments, wherein the pipes comprise visual indicia configured to indicate correct depth of axial insertion of the pipes in the coupling.

Embodiment 32

The pipe system of any of these embodiments, wherein the visual indicia comprises a shallow groove.

Embodiment 33

The pipe system of any of these embodiments, wherein the visual indicia comprise shallow grooves circumscribing each pipe adjacent axial ends thereof.

Embodiment 34

The pipe system of any of these embodiments, wherein an axial centerline of the axial-facing portion of the coupling is axially spaced apart from a first axial end of the coupling by a first distance, the axial centerline of the axial-facing portion is axially spaced apart from a second axial end of the coupling by a second distance, and the second distance is at least about twice the first distance.

Embodiment 35

The pipe system of any of these embodiments, wherein an axial centerline of the axial-facing portion is axially spaced apart from an axial center of the coupling by at least about 1% of the coupling axial length, at least about 5%, at least about 10%, at least about 20%, or at least about 25%; and not greater than about 50%, not greater than about 45%, not greater than about 40%, not greater than about 35%, or not greater than about 30%.

Embodiment 36

The pipe system of any of these embodiments, wherein the coupling comprises a straight coupling for only two pipes or a tee for at least three pipes.

Embodiment 37

The pipe system of any of these embodiments, wherein the coupling comprises at least one of a fitting, a plug and a sweep.

Embodiment 38

The pipe system of any of these embodiments, wherein the axial-facing portion comprises a mechanical stop that is chamfered in both axial directions.

Embodiment 39

The pipe system of any of these embodiments, wherein the coupling body is configured to freely axially release the pipes from the axial ends from which the pipes are configured to protrude.

Embodiment 40

The pipe system of any of these embodiments, wherein the coupling comprises at least one of a seal groove and a retaining ring groove.

Embodiment 41

The pipe system of any of these embodiments, wherein the coupling comprises retaining ring grooves and seal grooves, each of the pipes comprises only a pipe retaining ring groove but not a pipe seal groove, and the coupling is configured to retain the pipes with splines in an installed configuration.

Embodiment 42

The pipe system of any of these embodiments, wherein no other fittings are required to form a pipe assembly other than retaining rings and seals.

Embodiment 43

The pipe system of any of these embodiments, wherein the retaining rings must be installed from an exterior of the coupling.

Embodiment 44

The pipe system of any of these embodiments, wherein the coupling and the pipes are not threaded.

Embodiment 45

The pipe system of any of these embodiments, wherein the coupling is configured to not prevent rotation of the pipes relative to each other and to the coupling.

Embodiment 46

The pipe system of any of these embodiments, wherein the axial-facing portion is configured to limit axial insertion of both pipes, such that the pipes are configured to never make contact with each other inside the coupling due to the presence of the axial-facing portion.

Embodiment 47

The pipe system of any of these embodiments, wherein the pipes have a substantially constant outer diameter, other than axial tips thereof, which can be chamfered.

Embodiment 48

The pipe system of any of these embodiments, wherein the coupling is injection molded and is not extruded or machined.

Embodiment 49

The pipe system of any of these embodiments, wherein the pipes are configured to be identical to each other.

Embodiment 50

A coupling, comprising:
a coupling body having an axis, first and second axial ends, a first pipe axial insertion depth, a second pipe axial insertion depth, and retaining ring grooves, and the coupling body is configured to directly physically engage two identical pipes; and
the second pipe axial insertion depth is at least about double the first pipe axial insertion depth.

Embodiment 51

A pipe system, comprising:
a coupling having an axis, retaining ring grooves, a first pipe axial insertion depth, a second pipe axial insertion depth, and the second pipe axial insertion depth is at least about twice the first pipe axial insertion depth; and
first and second pipes configured to be axially positioned in the first and second pipe axial insertion depths, respectively, and configured to be secured with retaining rings to the coupling.

Embodiment 52

A pipe assembly, comprising:
a coupling having an axis, retaining ring grooves, a first pipe axial insertion depth, a second pipe axial insertion depth, and the second pipe axial insertion depth is at least about twice the first pipe axial insertion depth; and
first and second pipes axially positioned in the first and second pipe axial insertion depths, respectively, and secured to the coupling with retaining rings.

Embodiment 53

A pipe system, comprising
a coupling having an axis, an axial length, an axial center, an interior with an inner diameter that is substantially constant over an entirety of the axial length, and a single shoulder protrudes radially inward from the inner diameter, such that the coupling has no other shoulders in the interior, and the single shoulder is not axially aligned with the axial center of the coupling; and
at least two pipes configured to be mounted to the coupling.

Embodiment 54

A method of replacing pipe in a pipe assembly, the method comprising:
providing the pipe assembly with an axis and a plurality of pipes secured to a plurality of couplings with retaining rings;
releasing the retaining rings from a selected coupling having a first pipe and a bad pipe in need of replacement, and releasing the retaining ring from an adjacent coupling joined to the bad pipe;
axially sliding the selected coupling over the first pipe until the first pipe contacts a shoulder in the selected coupling, such that the bad pipe is exposed from the selected coupling;
moving the bad pipe off-axis from the selected coupling, and removing the bad pipe from the adjacent coupling; and then
installing a new pipe, in place of the bad pipe, by inserting the new pipe into the adjacent coupling, moving the new pipe on-axis with the selected coupling, and axially sliding the selected coupling onto the new pipe.

Embodiment 55

A method of replacing pipe in a pipe assembly, the method comprising:
providing the pipe assembly with an axis and a plurality of pipes secured to a plurality of couplings with retaining rings;

releasing the retaining rings from a selected coupling having a first pipe and a second pipe in need of replacement, and releasing the retaining rings from an adjacent coupling joined to the second pipe, the adjacent coupling having a third pipe;

axially sliding the selected coupling over the first pipe until the first pipe contacts a shoulder in the selected coupling, and axially sliding the adjacent coupling over the third pipe until the third pipe contacts a second shoulder in the adjacent coupling, such that the second pipe is exposed from the selected coupling and the adjacent coupling;

removing the second pipe from the selected coupling and the adjacent coupling; and then installing a new pipe, in place of the second pipe, by axially sliding the selected coupling and the adjacent coupling onto the new pipe.

Embodiment 56

A method of replacing a component in a pipe assembly, the method comprising:

providing the pipe assembly with an axis and a plurality of pipes secured to a plurality of components with retaining rings;

releasing the retaining rings from a bad component in need of replacement, the bad component having first and second pipes;

axially sliding the bad component over the first pipe until the first pipe contacts a shoulder in the bad component, such that the second pipe is exposed from the bad component;

moving the second pipe off-axis relative to the bad component;

removing the bad component from the first pipe; and then installing a new component, in place of the bad component, by axially inserting the new component onto the first pipe, repositioning the second pipe on-axis relative to the new component, and axially sliding the new component onto the second pipe.

Embodiment 57

The coupling of any of these embodiments, wherein the coupling body comprises retaining ring grooves, each of the pipes comprises a pipe retaining ring groove and a pipe seal groove, and the coupling is configured to retain the pipes with retaining rings in an installed configuration.

Embodiment 58

The coupling of any of these embodiments, wherein the pipes are configured to make contact with each other inside the coupling despite the presence of the single shoulder.

Embodiment 59

The coupling of any of these embodiments, wherein the coupling body comprises one of a straight coupling, an elbow and a tee.

Embodiment 60

The coupling of any of these embodiments, wherein an axial center of the coupling body comprises a tapped hole configured for connection to a component.

Embodiment 61

The coupling of any of these embodiments, wherein the tapped hole is configured to be plugged when the component is not used, and the component comprises a tee or a wye.

Embodiment 62

The coupling of any of these embodiments, wherein the coupling body comprises an anchor configured to enhance movement of the coupling relative to the pipes using tools.

Embodiment 63

A pipe assembly, comprising:

a coupling having a tubular profile with an axis, coupling axial ends, and a bore with inner seal grooves;

pipes mounted in the bore of the coupling, each pipe having a pipe axial end;

a distance A is defined as an axial overlap distance from one of the coupling axial ends to a respective pipe axial end; and a distance D is defined as an axial separation distance from one of the pipe axial ends to the single shoulder, and $D>A$.

Embodiment 64

The pipe system of any of these embodiments, wherein the axial-facing portion can automatically align retaining ring grooves of the coupling and at least one pipes when said at least one of the pipes abuts the axial-facing portion.

Embodiment 65

The pipe system of any of these embodiments, wherein at least one of the pipes can be positioned in both an installed state and a disassembled state with respect to the coupling without said at least one of the pipes being axially repositioned.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity can not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. A coupling forming a joint with at least two pipes, the coupling comprising:
    a coupling body having an axis, an axial length, an axial center, axial ends and an inner surface comprising an inner diameter that is substantially constant over an entirety of the axial length; and
    a single shoulder protruding radially inward relative to the axis from the inner surface, such that the inner surface has no other shoulders, and the single shoulder is not axially aligned with the axial center of the coupling body,
    wherein the coupling body comprises retainer grooves and seal grooves, each of the at least two pipes comprises only a pipe retainer groove but not a pipe seal groove, and the coupling is configured to retain the pipes with retainers in an installed configuration.

2. The coupling of claim 1, wherein, in an installed configuration, the single shoulder is substantially in contact with only one of the at least two pipes, such that another of the at least two pipes is free of contact with the single shoulder.

3. The coupling of claim 1, wherein an exterior of the coupling body comprises visual indicia to indicate a location of the single shoulder from the exterior of the coupling.

4. The coupling of claim 1, wherein an axial centerline of the single shoulder is axially spaced apart from a first axial end by a first distance, the axial centerline of the single shoulder is axially spaced apart from a second axial end by a second distance, and the second distance is at least about twice the first distance.

5. The coupling of claim 1, wherein the coupling comprises a straight coupling for only the at least two pipes or comprises a tee for the at least two pipes and a third pipe.

6. The coupling of claim 1, wherein the single shoulder comprises a mechanical stop comprising one of a rectangular hard stop and a chamfered stop.

7. The coupling of claim 1, wherein the coupling body is configured to freely axially release the at least two pipes from the axial ends from which the at least two pipes are configured to protrude.

8. The coupling of claim 1, wherein the single shoulder is configured to limit axial insertion of the at least two pipes, such that the at least two pipes are configured to never make contact with each other inside the coupling due to the presence of the single shoulder.

9. The coupling of claim 1, wherein the coupling body comprises an anchor configured to enhance movement of the coupling relative to the at least two pipes using tools.

10. The coupling of claim 1, further comprising:
    a first pipe axial insertion depth and a second pipe axial insertion depth of the at least two pipes, wherein the second pipe axial insertion depth is at least about double the first pipe axial insertion depth.

11. A pipe system, comprising:
    a coupling having an axis, axial ends, an interior and an axial-facing portion in the interior; and
    at least two pipes configured to be inserted into different axial ends of the coupling and secured therein with retainers, the axial-facing portion of the coupling is configured to substantially remain in contact with only one of the pipes, and another one of the pipes does not axially abut, either directly or indirectly, any axial-facing portion of the coupling in the installed position other than through a respective retainer, such that said another one of the pipes only radially abuts the coupling with respect to the axis.

12. The pipe system of claim 11, wherein the coupling comprises an inner diameter that is substantially constant over an entirety of the axial length other than a retainer and a seal groove.

13. The pipe system of claim 11, wherein the axial-facing portion is not axially aligned with an axial center of the coupling.

14. The pipe system of claim 11, wherein an axial centerline of the axial-facing portion of the coupling is axially spaced apart from a first axial end of the coupling by a first distance, the axial centerline of the axial-facing portion is axially spaced apart from a second axial end of the coupling by a second distance, and the second distance is at least about twice the first distance.

15. The pipe system of claim 11, wherein the axial-facing portion comprises a mechanical stop that is chamfered in both axial directions.

16. The pipe system of claim 11, wherein the coupling body is configured to freely axially release the pipes from the axial ends from which the pipes are configured to protrude.

17. The pipe system of claim 11, wherein the coupling comprises at least one of a seal groove and a retainer groove.

18. The pipe system of claim 11, wherein the coupling comprises retainer grooves and seal grooves, each of the pipes comprises only a pipe retainer groove but not a pipe seal groove, and the coupling is configured to retain the pipes with splines in an installed configuration.

19. The pipe system of claim 11, wherein the axial-facing portion is configured to limit axial insertion of both pipes, such that the pipes are configured to never make contact with each other inside the coupling due to the presence of the axial-facing portion.

20. The pipe system of claim 11, wherein the pipes have a substantially constant outer diameter, other than axial tips thereof, which can be chamfered.

21. The pipe system of claim 11, wherein the axial-facing portion can automatically align retainer grooves of the coupling and at least one of the pipes when said at least one of the pipes abuts the axial-facing portion.

22. The pipe system of claim 11, wherein at least one of the pipes can be positioned in both an installed state and a disassembled state with respect to the coupling without said at least one of the pipes being axially repositioned.

* * * * *